(12) United States Patent
Viktorsson et al.

(10) Patent No.: US 6,397,080 B1
(45) Date of Patent: May 28, 2002

(54) METHOD AND A DEVICE FOR USE IN A VIRTUAL ENVIRONMENT

(75) Inventors: Per Viktorsson; Kjell Borg, both of Umeå (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/324,846

(22) Filed: Jun. 3, 1999

(30) Foreign Application Priority Data

Jun. 5, 1998 (SE) .............................................. 9802001

(51) Int. Cl.$^7$ ................................................ H04Q 7/20
(52) U.S. Cl. ........................................ 455/558; 455/556
(58) Field of Search ................................ 455/558, 557, 455/556

(56) References Cited

U.S. PATENT DOCUMENTS 5,546,463 A    8/1996  Caputo et al.
5,553,864 A  * 9/1996  Sitrick ........................... 463/31
5,883,606 A  * 3/1999  Smoot ............................ 345/7

FOREIGN PATENT DOCUMENTS

EP   0 843 168 A2   5/1998
EP   0 696 018 A2   12/1998
WO   98/57474       12/1998

* cited by examiner

Primary Examiner—Daniel Hunter
Assistant Examiner—Alan T. Gantt
(74) Attorney, Agent, or Firm—Nixon & Vanderhye P.C.

(57) ABSTRACT

Information about avatar characteristics for a user are stored in a removable memory card (115), for example in a SIM card for the GSM system. The information regarding the avatar can then be moved from one access terminal to another. A virtual world, which the avatar is designed to enter, can then be accessed from many different access terminals by means of inserting the SIM card and entering a personal identity number (PIN) code. Thus by adding such a memory function to a removable memory card (e.g. a SIM card or a Smart card), besides of making it possible to access a virtual world from different access terminals, also makes it possible to use avatars in new applications, such as in a GSM phone or another mobile phone or terminal.

11 Claims, 2 Drawing Sheets

METHOD AND A DEVICE FOR USE IN A VIRTUAL ENVIRONMENT

TECHNICAL FIELD

The present invention relates to a method and a device for facilitating the handling of information in a virtual environment. In particular the present invention relates to storage and transmission of avatar information.

BACKGROUND OF THE INVENTION AND PRIOR ART

The development of Internet and other large computer networks has made it possible meet, play, work, and exchange information in a virtual environment instead of in the real world. In such a virtual environment users, which have entered the virtual world, can communicate with other users by means of an avatar.

An avatar is a character, which can move around in the virtual world and communicate and/or interact in the common context of the virtual world under control of a user. The virtual world or virtual reality (VR) can be generated by any suitable graphical code, such as Virtual Reality Modelling Language (VRML).

The avatar can usually be whatever the user desires, for example a cartoon, a fish, a three-dimensional picture of the user or any graphical element. To other users of the virtual world the avatar is the graphical representation of the character the user represents. The avatar is sent into the virtual world, when the user controlling the avatar logs on to the virtual world.

Another example of an avatar is a "talking head", i.e. a three-dimensional representation of a person's head, which can move its lips in synchronisation with speech. Talking heads can be used to create an illusion of a visual interconnection, even though the connection used is a speech channel.

Furthermore, in "Shared Spaces", British Telecommunications Engineering, vol 15, July 1996, avatars for use in, e.g. telephone networks are described.

Also, in GSM 01.02, "Digital cellular telecommunications system (Phase 2+); General description of a GSM Public Land Mobile Network (PLMN)", European Telecommunications Standards Institute (ETSI), Valbonne, France, 1996, GSM 02.17 (prETS 300 922). "Digital cellular telecommunications system; Subscriber Identity Module (SIM) Functional characteristics", European Telecommunications Standards Institute (ETSI), Valbonne, France, 1996 and GSM 11.11 (ETS 300 977). "Digital cellular telecommunications system (Phase 2+); "Specification of the Subscriber Identity Module—Mobile Equipment (SIM-ME) interface", European Telecommunications Standards Institute (ETSI), Valbonne, France, 1997. A GSM PLMN network and a SIM-card for use in a GSM system are described.

However, there is a problem of making the technique suitable for access of a virtual world from different access terminals. Thus, when logging on to the virtual world, information regarding the avatar must be sent from the access terminal to the virtual world in order for the avatar to appear in the virtual world. This information is today usually stored in a memory of the access terminal, so that when logging on to the virtual world information regarding the avatar is fetched from the memory of the access terminal and transmitted to the virtual world. Thus, the virtual world can only be accessed from certain, pre-selected, terminals in which the avatar information is stored.

SUMMARY

It is an object of the present invention to overcome the problem as set out above. This object is obtained by means of adding a new memory function in a removable memory card, such as a Subscriber Identity Module (SIM) or a smart card and by integrating the information about the avatar in the card.

It is another object of the present invention to provide a method and a system whereby an avatar can be used in a mobile phone or a mobile communications terminal.

Thus, by storing information about the avatar characteristics for a user in a removable memory card, for example in a SIM card for the GSM system, the information regarding the avatar can be moved from one access terminal to another. The virtual world can then be accessed from many different access terminals by means of inserting the SIM card and entering a personal identity number (PIN) code.

The new added memory function, besides of making it possible to access a virtual world from different access terminals, also makes it possible to use avatars in new applications, such as in a GSM phone or another mobile phone or terminal.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1:
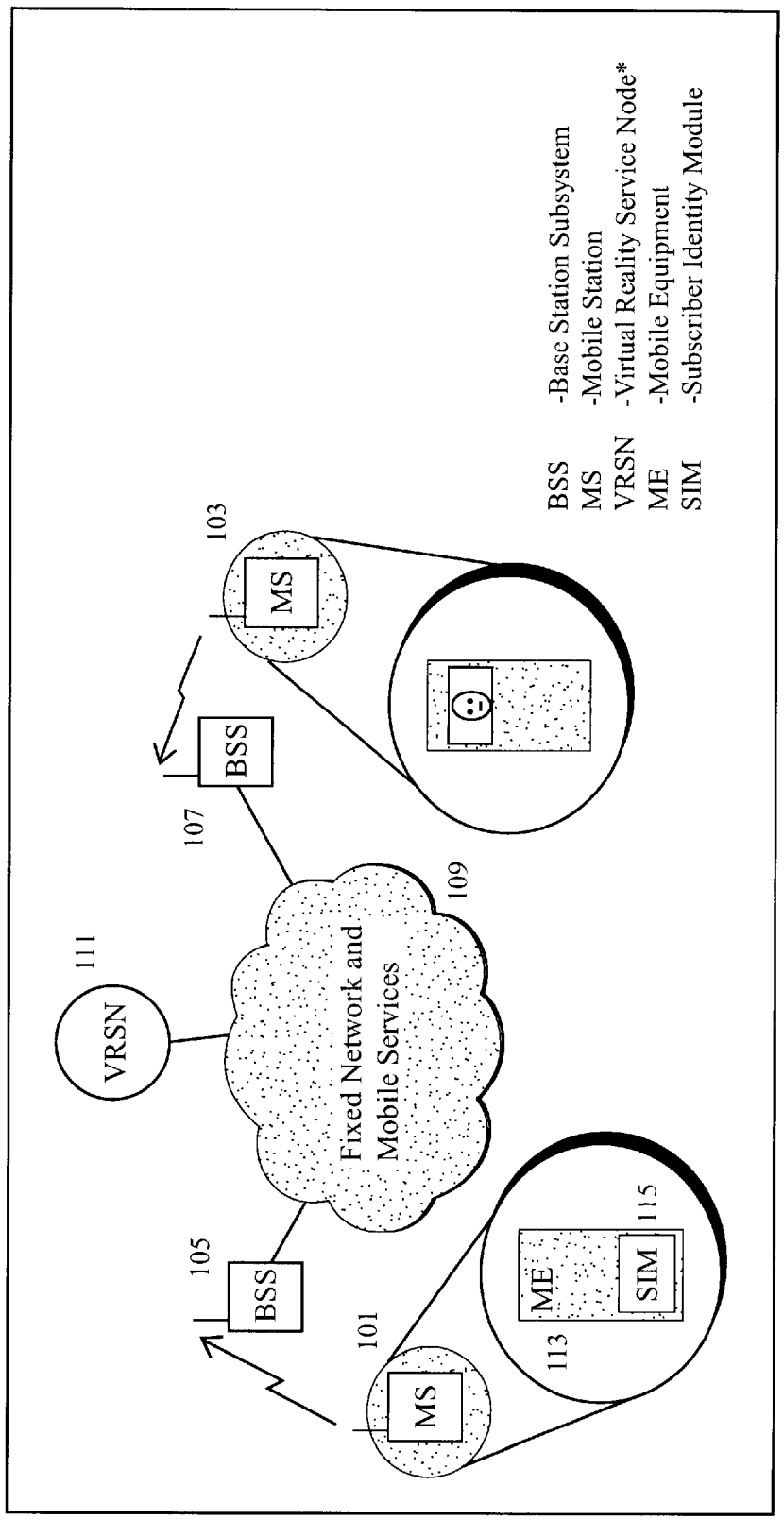
FIG. 1 is a general view illustrating exchange of avatars in a GSM PLMN network.

In FIG. 1, a general view of a GSM—(Global System for Mobile communication) PLMN (Public Land Mobile Network) is shown. The network comprises Mobile stations (MS) 101 and 103, which can connect to different base station subsystems BSS 105 and 107, respectively. The base stations 105 and 107 are interconnected by means of a network 109, which can comprise different services for mobile telephony. One such service that can be provided is a service for virtual reality as indicated by the service node 111 connected to the network 109.

Furthermore, the mobile stations 101 and 103 in the embodiment shown are mobile equipment 113 having a Subscriber Identity Module (SIM) 115. Thus, the GSM PLMN network, as described in the above cited papers, has a wireless interface with the mobile stations (MS) 101 and 103, the subscribers mobile equipment 113, such as cellular phones, via base station subsystems (BSS) 105 and 107 covering geographical cells.

Each MS 101 and 103 thus consists of mobile equipment 113 that carries a SIM (subscriber identity module) 115 which authentifies the subscriber using the international mobile subscriber identity (IMSI) code of the SIM 115 and the cryptographic features of the system. In a preferred embodiment, the SIM card is a simple type of Smart Card, which easily can be removed from the mobile equipment 113.

When a subscriber enters a cell, i.e. an area covered by a BSS 105, 107 of the network, the MS and BSS exchange information between each other, such as an IMSI code. In this stage a list of supported or subscribed services are also transferred to the network from the MS 101. Much of this information is stored in the SIM card of the MS 101 and especially the service list.

Figure 2:
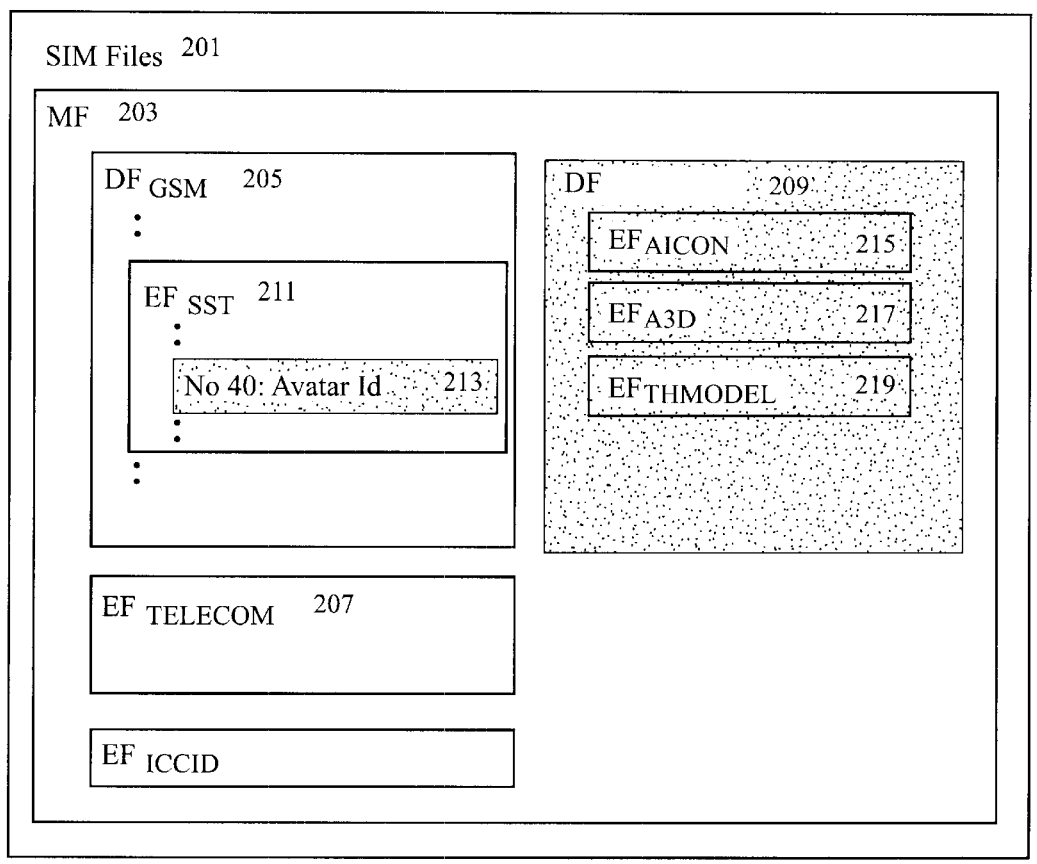
FIG. 2 is a schematic block diagram of a GSM SIM card memory system.

In FIG. 2 the SIM files for a SIM card for use in a GSM-system is shown. Thus, the SIM files 201 comprise a master file 203. The master file comprises three different directories one GSM file 205, one telecommunication file 207 and one avatar identification file 209. The files 205 and 207 are present in conventional GSM SIM cards. In FIG. 2 the extensions in the file content of the SIM card 115 for supporting an avatar service are marked. The service list (EF-SST) 211 is extended with a service (No 40) 213 for avatar identity. In combination with the security facility of the GSM system, the network may ask the MS for the subscribers trusted avatar identity representation. There may be several types of avatar representations for different use stored on the SIM card.

One application may be what can be referred to as "A-face" presentation. This is the same functionality as A-number presentation in the original, conventional, telecommunication network, but in this case a simple iconic representation of the calling subscriber (A subscriber) is transferred during call-up to the B subscriber to be presented before the called mobile station 103 picks up the call. In FIG. 2 this is referred to as EF-AICON 215 and is located under the avatar identification directory 209.

It is also possible to use the avatar feature made available by means of including it in the SIM-card to enter with an avatar into a virtual world using a 3d representation stored in a EF-A3D file 217 on the SIM. This is done by the network asking the MS 101 and 103 for this specific type of representation after the communication has been established with the virtual world.

In yet another preferred embodiment the system is supplemented with a "talking head" representation, which may be defined in an EF-THMODEL file 219 on the SIM. This representation is used by the network or other MS units in the network to modulate the avatar representation synchronously with the subscriber's speech, e.g. moving the lips and face of an avatar presentation synchronously with the speech.

Different services in the network may ask for avatar representations, such as downloading avatars or the talking heads model for personalizing an agent for e.g. animated avatar enhanced voice mailbox messages.

Thus, by storing avatar information on a removable memory card, such as on a SIM card, Smart card or the like, the information about the avatar can be moved around and used in many different equipment. The avatar card can for example be used for accessing a virtual world from a mobile phone, a public phone booth, a public internet terminal, a personal computer (PC) or any other communication that can read the card comprising the avatar information. The use of such an avatar card in the form of a SIM card a Smart card etc. will facilitate the introduction and the use of new telecommunication services using avatars.

What is claimed is:

1. A removable memory card used in a telecommunication access terminal, the access terminal for connecting to a virtual world and communicating with other telecommunication access terminals over a network providing a service of virtual reality, the removable memory card comprising a memory for storing avatar characteristics information, and wherein the stored avatar characteristics information can be read at the terminal and transmitted to the network providing the service of virtual reality when the card is used for accessing the virtual world.

2. The card of claim 1, wherein the card further stores telecommunications information.

3. The card of claim 1, wherein the card is a SIM card.

4. A mobile terminal for use in cellular telecommunications, the mobile terminal comprising:

means for communicating in a wireless manner with other terminals via at least one base station of a cellular telecommunications system;

means for receiving and reading a removable memory card including stored avatar characteristics information; and means for accessing a virtual world by transmitting the stored avatar characteristics information to a network providing a service of virtual reality.

5. The mobile terminal of claim 4, wherein the mobile terminal comprises a cell phone.

6. The mobile terminal of claim 4, wherein the card further stores telecommunications information.

7. The mobile terminal of claim 4, wherein the card is a SIM card.

8. A method of using a mobile terminal which communicates with other mobile terminals via base stations of a cellular telecommunications network, the method comprising:

inserting a memory card into the mobile terminal, the memory card having stored thereon avatar characteristics relating to a user;

the mobile terminal communicating with a base station in order to access the cellular telecommunications network;

the mobile terminal retrieving the avatar characteristics from the memory card and transmitting the avatar characteristics to a network providing a service of virtual reality.

9. A method of accessing a network providing a service of virtual reality, the method comprising:

inserting a memory card into a telecommunications terminal, the memory card having stored thereon avatar characteristics relating to a user;

the telecommunications terminal retrieving the avatar characteristics from the memory card and transmitting the avatar characteristics to the network providing the service of virtual reality; and wherein the terminal is capable of communicating with other telecommunications terminals.

10. The method of claim 9, wherein the card is a SIM card.

11. The method of claim 9, wherein the terminal comprises a mobile phone.

* * * * *